(12) United States Patent
Galt

(10) Patent No.: US 6,290,891 B1
(45) Date of Patent: Sep. 18, 2001

(54) COOLING PROCESS FOR MOLDED ARTICLES

(75) Inventor: John Galt, Nobleton (CA)

(73) Assignee: Husky Injection Molding Systems Ltd. (CA)

( * ) Notice: Subject to any disclaimer, the term of this patent is extended or adjusted under 35 U.S.C. 154(b) by 0 days.

(21) Appl. No.: 09/638,759

(22) Filed: Aug. 14, 2000

Related U.S. Application Data

(62) Division of application No. 09/218,470, filed on Dec. 22, 1998, now Pat. No. 6,168,416.

(51) Int. Cl.[7] .................................................. B29C 45/20
(52) U.S. Cl. ....................... 264/237; 264/297.6; 264/336; 425/556
(58) Field of Search ................................ 264/237, 297.2, 264/297.3, 297.6, 328.8, 328.11, 334, 336, 538; 425/556, 576

(56) References Cited

U.S. PATENT DOCUMENTS

| | | | |
|---|---|---|---|
| 4,786,455 | * 11/1988 | Krishnakumar et al. | 264/297.8 |
| 4,836,767 | * 6/1989 | Schad et al. | 264/297.3 |
| 4,902,217 | * 2/1990 | Martin et al. | 264/543 |
| 5,653,934 | * 8/1997 | Brun, Jr. et al. | 264/334 |
| 5,830,404 | * 11/1998 | Schad et al. | 264/297.2 |
| 5,837,301 | * 11/1998 | Arnott et al. | 264/297.8 |

\* cited by examiner

Primary Examiner—Jill L. Heitbrink
(74) Attorney, Agent, or Firm—Bachman & LaPointe, P.C.

(57) ABSTRACT

A rotatable turret block is mounted on an index molding machine. The turret block includes at least one mold core for forming molded articles thereon at least one face of the rotatable turret block. The molded articles are transferred from the mold cores to spaced track members for retention and cooling thereon, and the cooled molded articles removed from the track members.

10 Claims, 14 Drawing Sheets

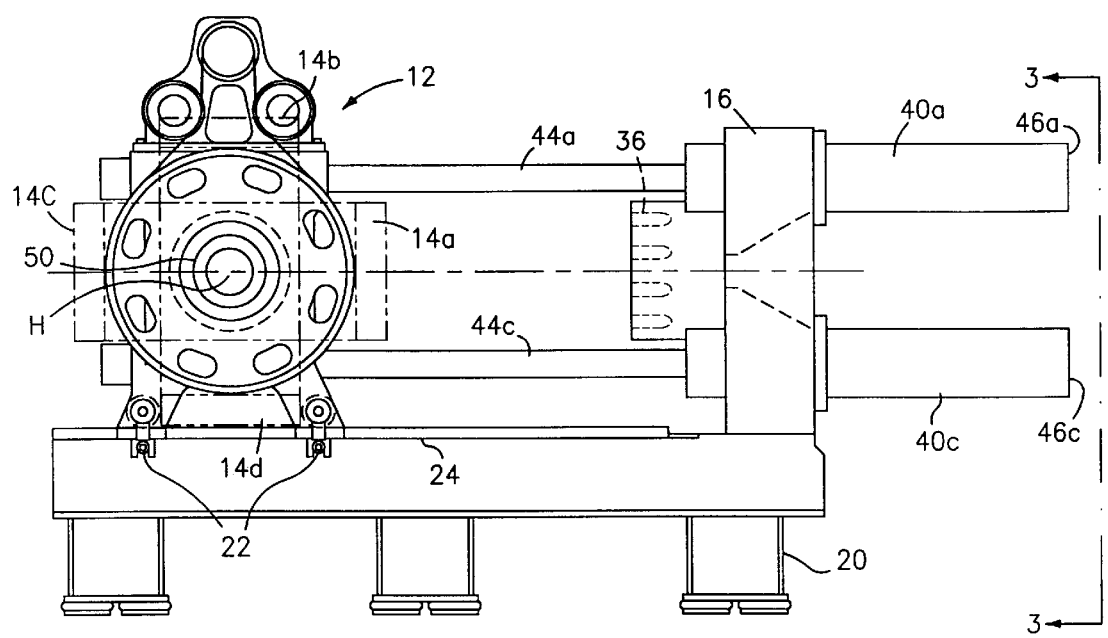
FIG. 2
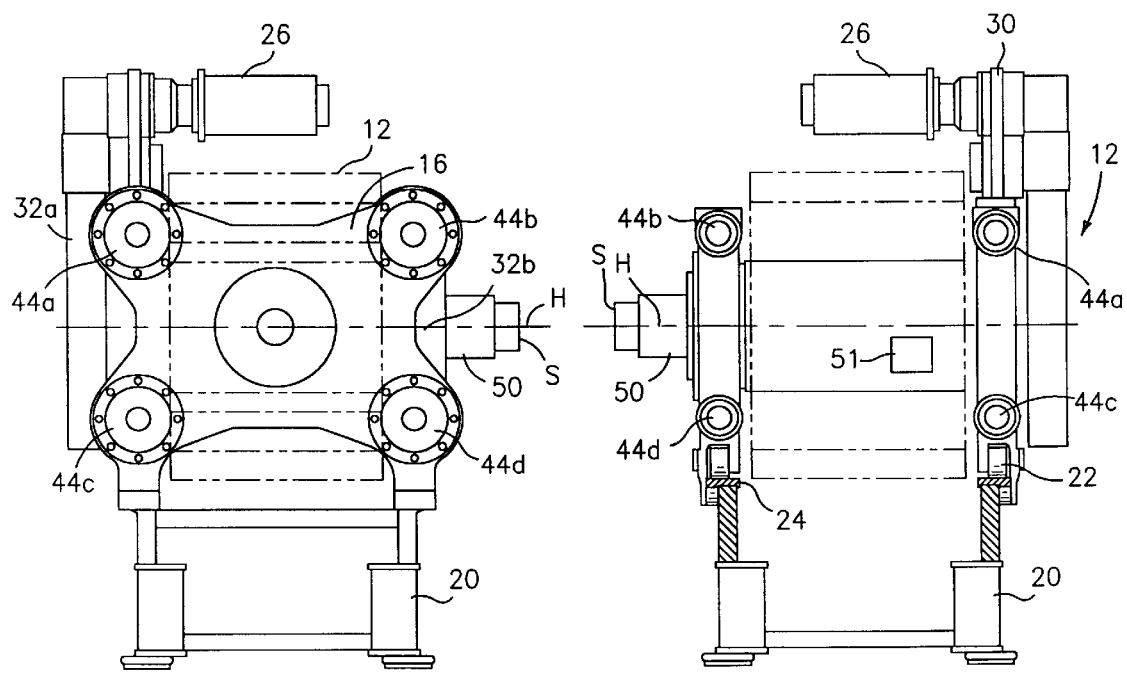
FIG. 3
FIG. 4

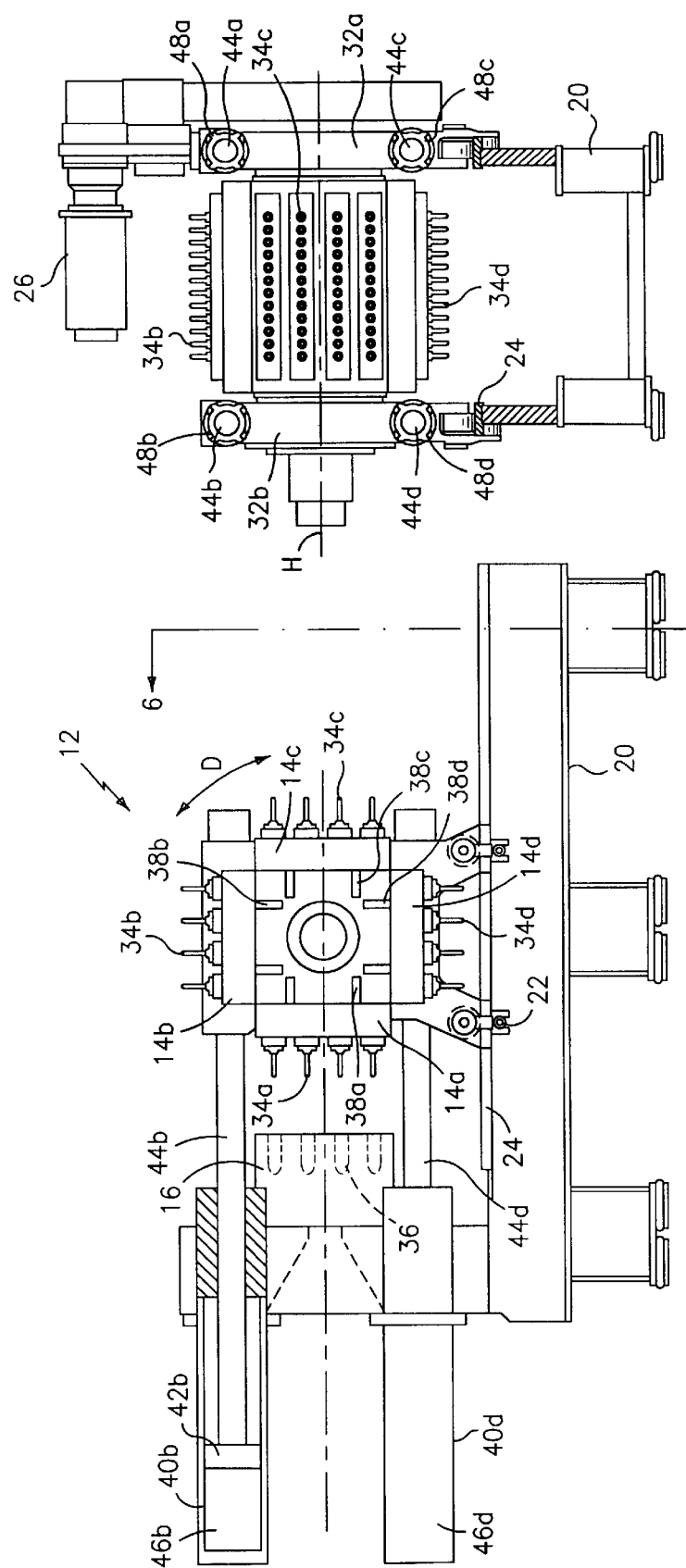

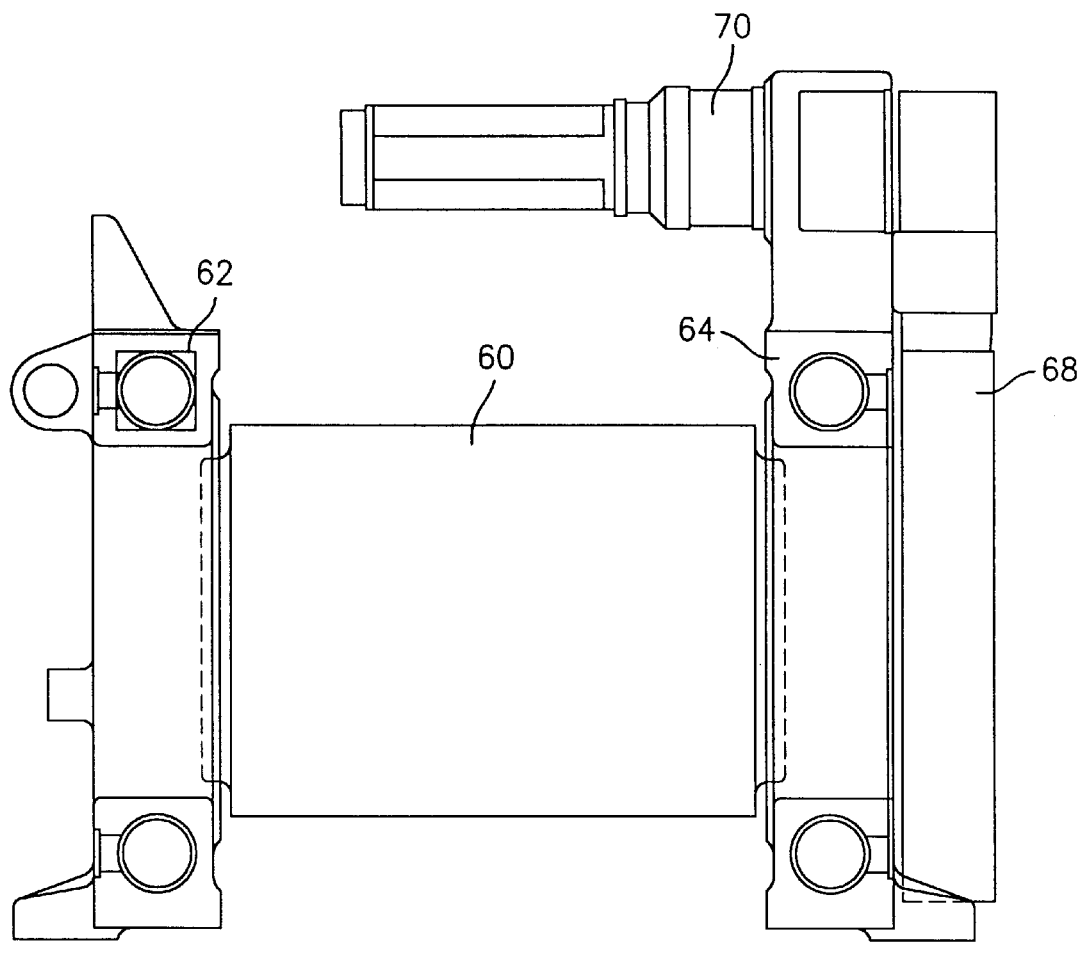
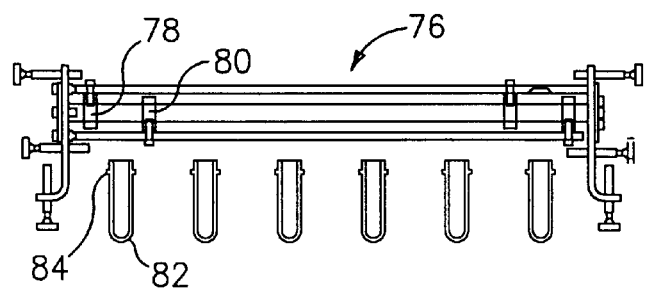
FIG. 8A

COOLING PROCESS FOR MOLDED ARTICLES

This is a Division of application Ser. No. 09/218,470, filed Dec. 22, 1998, now U.S. Pat. No. 6,168,416.

BACKGROUND OF THE INVENTION

The present invention relates to a cooling device for use with an index molding machine having a rotatable turret block mounted thereon. In accordance with the present invention, a device and process is provided for use with an index machine that may eject relatively thick walled parts during turret block rotation and provide means to capture and retain the ejected parts so that they remain damage free and can continue to cool.

U.S. Pat. No. 6,059,557 issued May 9, 2000, and U.S. Pat. No. 5,837,301, issued Nov. 17, 1998, both to the assignee of the present invention, both show fast cycling machines that use only two faces of a turret block for mounting mold halves. The device in the aforesaid patent application utilizes a robot to cool and remove the parts from the mold to provide extended cooling time and prevention of damage to the preform during post mold cooling. The device shown in the '301 patent teaches the concept of ejecting parts during the 180 degree rotation of the turret block when only two mold core sets are used. This teaching assumes that the parts are relatively thin and are sufficiently cooled on the mold cores to allow damage free ejection. Also, as the parts are ejected they fall randomly to a conveying system beneath the turret block.

U.S. Pat. No. 6,139,789, also to the assignee of the present invention, teaches ejecting parts from cooling tubes mounted on a robot take out plate wherein the parts fall into a fixture that continues cooling them and opens to allow the parts to fall through to a conveyor beneath.

It would be highly desirable to minimize cycle time by ejecting comparatively thick parts, especially during turret block rotation, without risking part damage and providing post mold cooling options.

Accordingly, it is a principal object of the present invention to provide a cooling device and method for use with an index molding machine which minimizes cycle time by ejecting comparatively thick parts.

It is a further object of the present invention to provide a device and method as aforesaid which may eject parts during turret block rotation and without risking damage to the part.

Further objects and advantages of the present invention will appear hereinbelow.

SUMMARY OF THE INVENTION

In accordance with the present invention, the foregoing objects and advantages are readily obtained.

The present invention provides a cooling device for use with an index molding machine having a rotatable turret block mounted thereon and having at least one and generally a plurality of mold cores for forming molded articles thereon on at least one and desirably two faces of said rotatable turret. The device includes track means having spaced track members adjacent the rotatable turret block means for transferring the molded articles from the mold cores to the spaced track members for retention and cooling thereon, and means for removing the cooled molded articles from the spaced track means. The mold core is engagable with a mold cavity for forming the molded articles in the mold cavity. The mold core is rotated with the molded articles thereon to position the molded articles above the spaced track members for transfer of the molded articles from the mold core to the track means, desirably during movement of the rotatable turret.

The process of the present invention for cooling the molded parts comprises: providing an index molding machine having a rotatable turret block mounted thereon and having at least one mold core for forming molded articles thereon on at least one face of the rotatable turret; positioning track means having spaced track members thereof adjacent the rotatable turret block; transferring the molded articles from the mold core to the spaced track members for retention and cooling therein; and removing the cooled molded articles from the spaced track members.

Further features of the present invention will appear hereinbelow.

BRIEF DESCRIPTION OF THE DRAWINGS

The present invention will be more readily apparent from the accompanying exemplificative drawings, wherein:

FIG. 2 is a partial elevational side view of the turret injection molding machine of FIG. 1 in an open position;

FIG. 3 is an end partially cross-sectional view taken along line 3—3 of FIG. 2;

FIG. 4 is an end view taken along line 4—4 of FIG. 1;

FIG. 5 is a side elevational and partially cross-sectional view from the side opposite of that shown in FIG. 2 with the injection molding machine in the partially open position;

FIG. 6 is an end elevational and detailed view taken along line 6—6 of FIG. 5;

FIG. 8A is an end view of an index machine turret block with rails beneath the block in the open position to allow the cooled parts to fall through onto a conveyor means or the like beneath the rails (not shown);

DETAILED DESCRIPTION OF PREFERRED EMBODIMENTS

Figure 1:
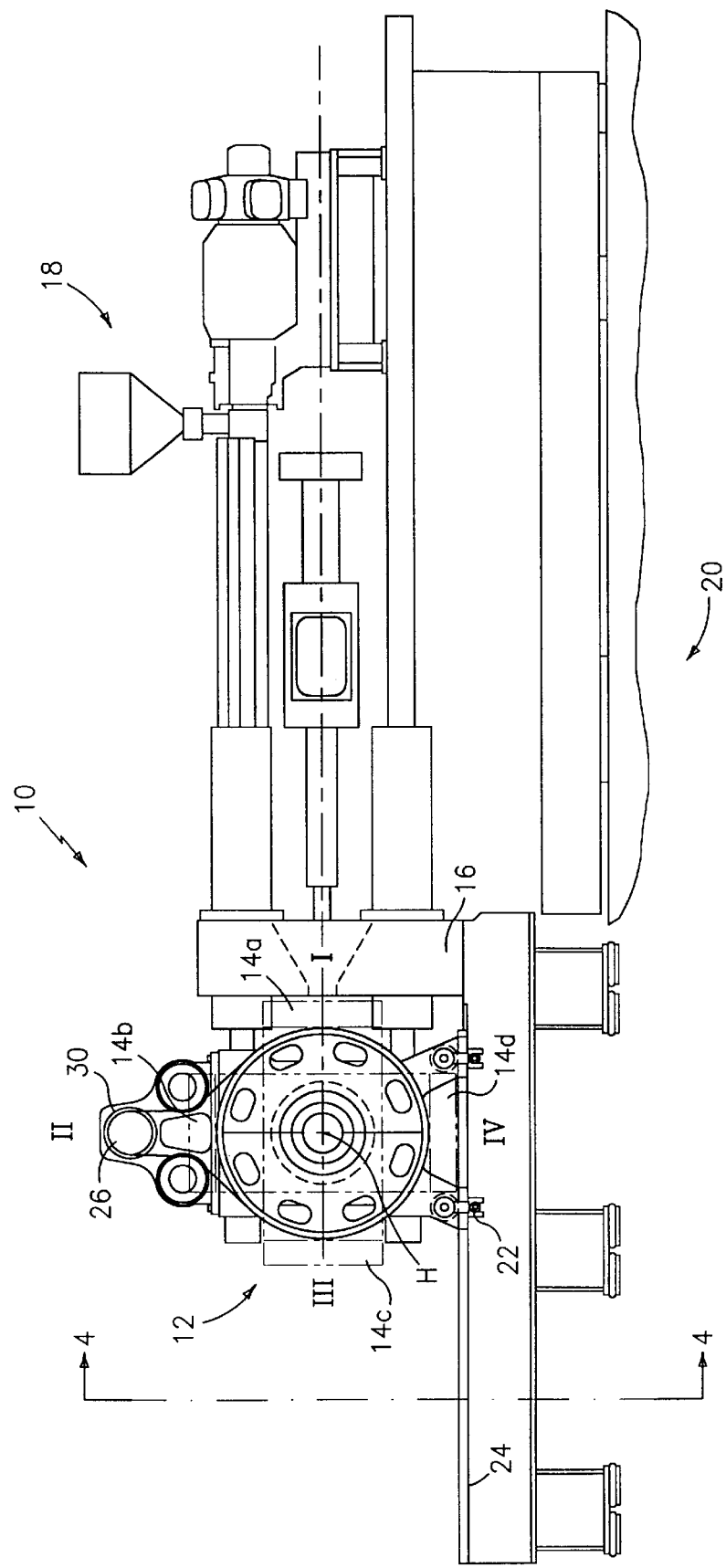
FIG. 1 is a side elevational schematic view of a turret injection molding machine in a closed position.

Referring now to the drawings in detail there is shown in FIG. 1 an elevational and schematic side view of a turret injection molding machine used in the present invention, which is designated generally as 10. Injection molding machine 10 generally includes a rotatable turret block 12 with a plurality of movable mold halves 14a–14d, a stationary mold half and platen 16 and injection unit 18, all positioned on base 20.

Injection molding machine 10 may be used for molding a variety of different types of articles and accordingly, is not limited for use with any particular type of article. Preforms are referred to throughout this description by way of example only.

While the turret block is shown throughout this description as rotatable on a horizontal axis, and this is the preferred embodiment, it is feasible that a similar design of a movable turret block providing the clamping action may be provided which is rotatable on a vertical axis. Accordingly, this invention is not considered limited to the horizontal axis feature.

As shown in FIGS. 1–5, turret block 12 is preferably longitudinally movable on base 20 via a set of rollers 22 attached to the bottom of the turret block and thereby providing a mold clamp force. Base 20 includes hardened ways 24 which engage rollers 22, wherein rollers 22 engage the underside of ways 24 so as to counteract upward forces and tipping forces that may act on the turret block assembly. Turret block 12 is rotatable as shown in FIGS. 1–5 by a motor, as an electric servo drive motor 26 and preferably on a horizontal axis H through arcuate sectors as shown in FIGS. 1–5 of substantially 90°. Preferably, the electric servo drive motor 26 is connected via a belt drive 30 to axis H for rotating turret block 12, as shown in FIG. 4, while the electric servo drive motor is preferably mounted on one of turret block carriages 32a and 32b extending from base 20.

As shown in FIG. 5, turret block 12 includes a plurality of movable mold halves, i.e. movable mold halves 14a–14d each of which includes a set of mold cores 34a–34d, respectively, each set having at least one mold core, adapted for engagement with a set of mold cavities 36, each set including at least one mold cavity and located in stationary mold half and platen 16. As shown in FIGS. 1–5, four movable mold halves or faces 14a–14d are provided on turret block 12, although any number supportable by the size of the turret block 12 can be used. Sets of mold cores 34a–34d are adapted to be rotated into horizontal and vertical alignment with sets of mold cavities 36.

Referring still to FIG. 5, turret block 12 includes sets of ejector pistons or stripper rings 38a–38d, and a system for the operation thereof, which operate on sets of mold cores 34a–34d and strippers positioned on movable mold halves 14a–14d, respectively. Accordingly, sets of ejector pistons or stripper rings 38a–38d are positioned within turret block 12 and parallel to sets of mold cores 34a–34d and perform the function of stripping the mold cores of finished molded articles, for example, preforms. Each movable mold half and platen 14 includes at least one ejector piston in each set 38a–38d for stripping finished articles from sets of mold cores 34a–34d. For the detailed design of the ejector piston or stripper ring system for use with sets 38, reference is made to U.S. Pat. No. 5,383,780, issued Jun. 24, 1995, to the assignee of the present invention, for incorporation by reference of a design of the ejector piston or stripper ring system, particularly column 4, line 29, to column 7, line 6, and FIGS. 1–8. Preferably, the ejector piston or stripper ring system is actuated via the hydraulic services supplied to the turret block. The hydraulically actuated ejector piston or stripper ring system actuated by on board hydraulic services is the preferred design, however, other designs may be used.

Turret block 12 is movable backward and forward along hardened ways 24 on base 20 via piston/cylinder assemblies 40a–40d positioned in stationary mold half and platen 16, as shown in FIG. 5. Preferably four piston/cylinder assemblies 40a–40d, as shown in FIGS. 2, 3 and 5, are used which are positioned in the corners of stationary mold half or platen 16. Each piston/cylinder assembly 40a–40d includes a piston 42a–42d (42a, 42c and 42d not shown), which pistons 42a–42d are attached to tie bars 44a–44d, respectively, which tie bar acts as the piston shaft. Accordingly, tie bars 44a–44d extend from the piston/cylinder assemblies 40a–40d and are connected at an opposite end to turret block 12. In order to move turret block 12 backward and forward relative stationary mold half and platen 16, pressurized fluid is forced into cylinders 46a–46d against pistons 42a–42d, respectively. The side of pistons 42a–42d in which pressurized fluid is forced against, determines the direction in which turret block 12 moves relative stationary mold half and platen 16, that is, either into an open or closed position, shown in FIGS. 2 and 5, respectively. Tie bars 44a–44d pass through the turret block carriages 32a and 32b and are attached thereto via retaining nuts 48a–48d, as shown in FIG. 6, respectively.

Services S, shown schematically in FIG. 3 and 4, are provided to turret block 12 via a rotary union 50, also shown schematically. Accordingly, as turret block 12 rotates, services S are continuously supplied to the movable mold halves 14a–14d. Such services S include the supply of electricity, pressurized fluid, cooling fluids, and hydraulic fluids, etc. For using these services, turret block 12 also includes the required circuitry and control valves 51 (shown schematically) on board and movable and rotatable with the turret block.

Injection unit 18, preferably in the form of a reciprocating screw injection unit, is connected with stationary mold half and platen 16 positioned on base 20 for providing melt to the mold cores for molding. Injection unit 18 is preferably movable into and out of engagement with stationary mold half and platen 16 by means of carriage cylinders (not shown) on rollers and hardened ways, similar to as described above for use with turret block 12. If desired, injection molding machine 10 of the present invention can provide co-injection of articles, for example, preforms. For this arrangement, two conventional reciprocating screw injection units are used to feed two different kinds of resins into conventional mold cavities, such as those shown in stationary mold half and platen 16, which mold half and platen 16 may include a two material hot runner system which delivers both resins into each mold cavity within stationary mold half and platen 16 for molding multi-layered articles, for example, preforms.

In accordance with the preferred embodiment of the present invention, a two faced turret block is rotated through 180 degrees during the combined clamp open and close motions to present alternating mold cores to the mold cavity. A mechanical linkage creates the rotary motion using the clamp opening and closing motions. A partial stroke position means may be provided to allow the mold cores to clear the mold cavities before rotation is permitted.

FIGS. 1–6 teach the basic principle of the turret machine in which the carriage and turret block perform all the functions of a conventional clamp, opening, closing and clamping the mold, ejecting the parts and providing services to the mold's core halves. The same carriage and turret structure including the same linear motion means, tiebar clamping, part ejection means and services provided may be incorporated in FIGS. 7–13 described schematically hereinbelow.

The preferred embodiments of the present invention are described hereinbelow with reference to FIGS. 7–13.

Figure 7A:
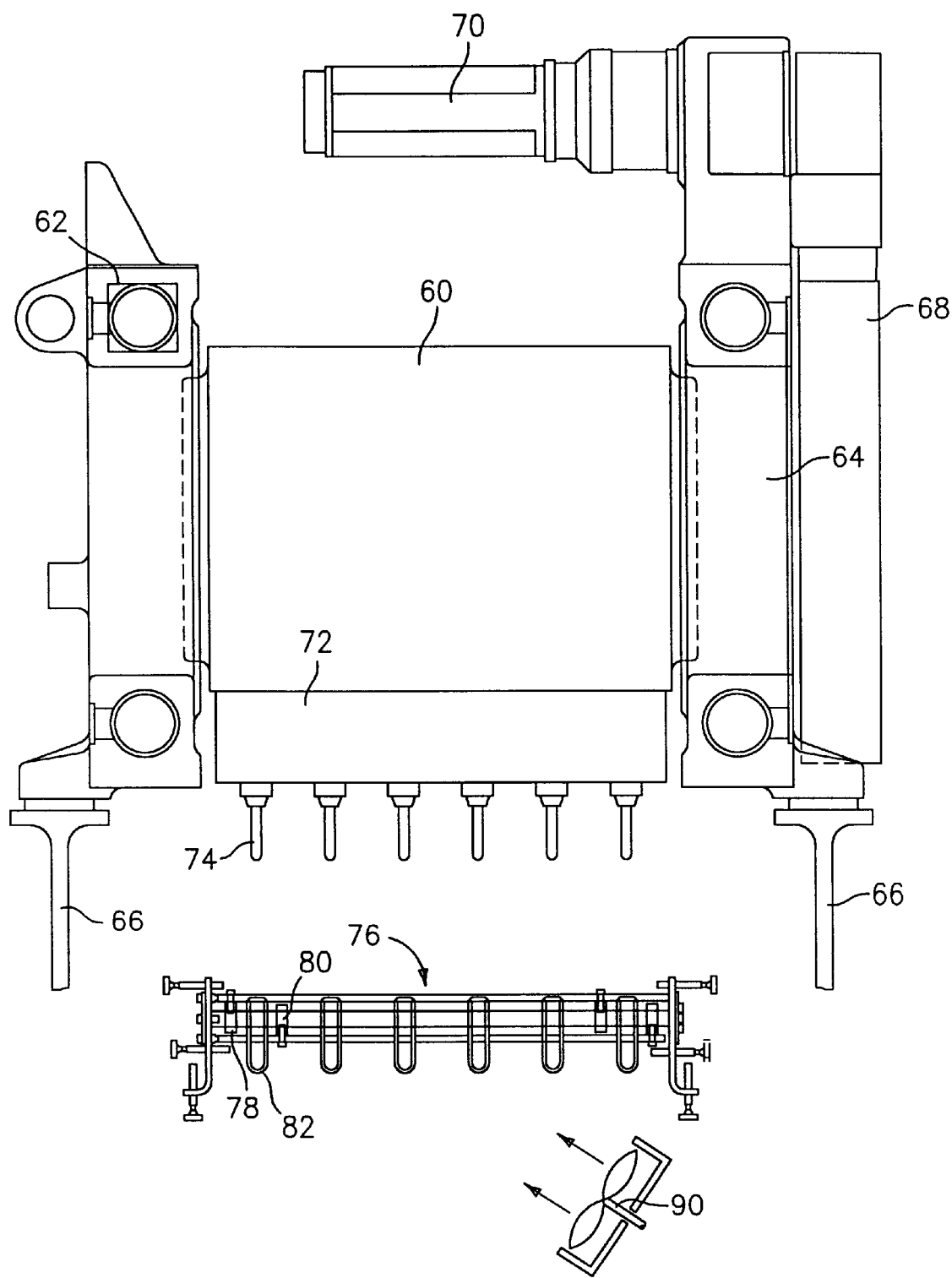
FIG. 7A is an end view of an index machine turret block with rails beneath the block in the closed position to capture ejected parts.
Figure 7B:
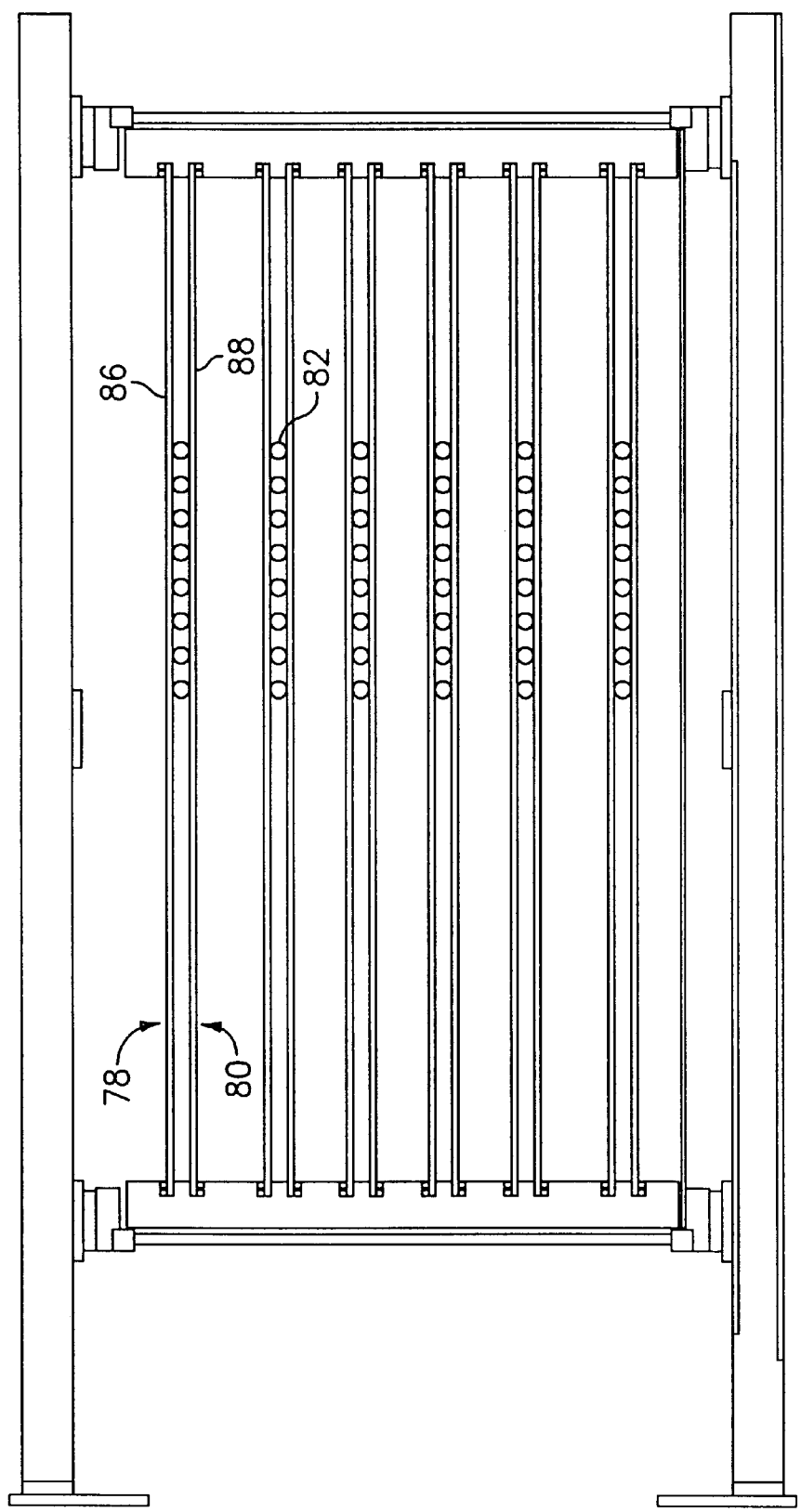
FIG. 7B is a plan view of the rails of FIG. 7A with captured ejected parts.
Figure 8B:
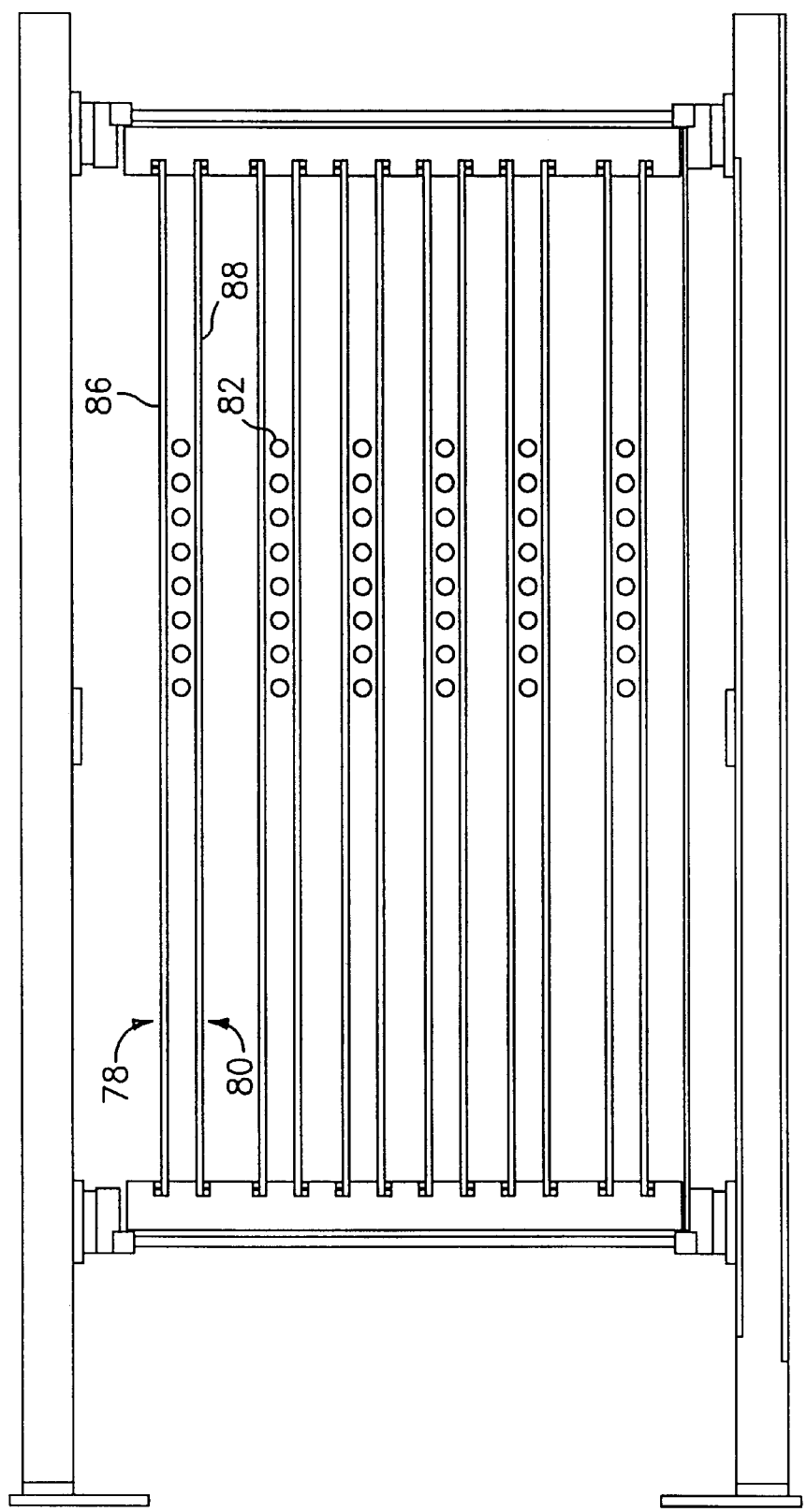
FIG. 8B is a plan view of the rails of FIG. 8A with cooled parts falling through the rails.

FIGS. 7A and 8A show end views of rotatable turret block 60 carried on journals between two carriers 62, 64 which slide on machine base 66 shown schematically in FIG. 7A. Turret block 60 may be rotated by belt 68 driven by motor 70 in a manner shown in FIGS. 1–6. The turret block 60 is more clearly shown in FIGS. 1–6 and is shown in FIG. 7A with one mold core half 72 having multiple rows of cores 74, with one row of cores 74 shown in FIG. 7A, shown passing through the "down" position with the cores 74 facing downwards. Beneath the rotatable turret block and beneath the cores is a track means 76 including a pair of spaced track members or rails 78, 80. Preforms 82 formed on cores 74 include an outwardly extending flange 84 (shown more clearly in FIG. 8A), and rails 78, 80 include spaced ledge members 86, 88 (shown more clearly in FIG. 7B). In the closed position shown in FIGS. 7A & 7B, the rails and ledge members are spaced closer together than in the open position shown in FIGS. 8A & 8B so that they form a supporting track for the outwardly extending flanges of the preforms. Thus, in the closed position the rails 78, 80 retain preforms 82 ejected from the passing mold cores 74. The preforms fall into the space between the rails and are captured thereby. The flanges 84 of the preforms 82 extend beyond the base diameter of the molded part so that the width of the track can be set to allow most of the part to pass between the rails until the outwardly projecting flanges are blocked from further passage by the ledges 86, 88 of rails 78, 80 by virtue of the extended width of the flanges, as clearly shown in FIGS. 7A & 7B. Thereby the preforms are held between the rails separated from each other and they can be subjected to further cooling for example from air blown by fans 90 if needed. As shown in FIGS. 8A and 8B, rails 78, 80 can be moved farther apart after desired cooling by any desired motive means (not shown) so that ledges 86, 88 are wider than the width of flanges 84, to allow molded parts 82 to fall between the rails, as onto a conveyor (not shown). Desirably, the timing for this action is arranged to occur just before the next set of parts are ejected from the cores so that the rails can then move back to the closed position to capture the next cycle of ejected parts, although if desired the track means may be relatively movable with respect to the turret block and sufficient capacity provided for more than one mold cycle.

FIGS. 9–13 show an alternate embodiment wherein the spacing of the spaced track members or rails is kept constant so that the molded parts do not fall between the rails.

Figure 9:
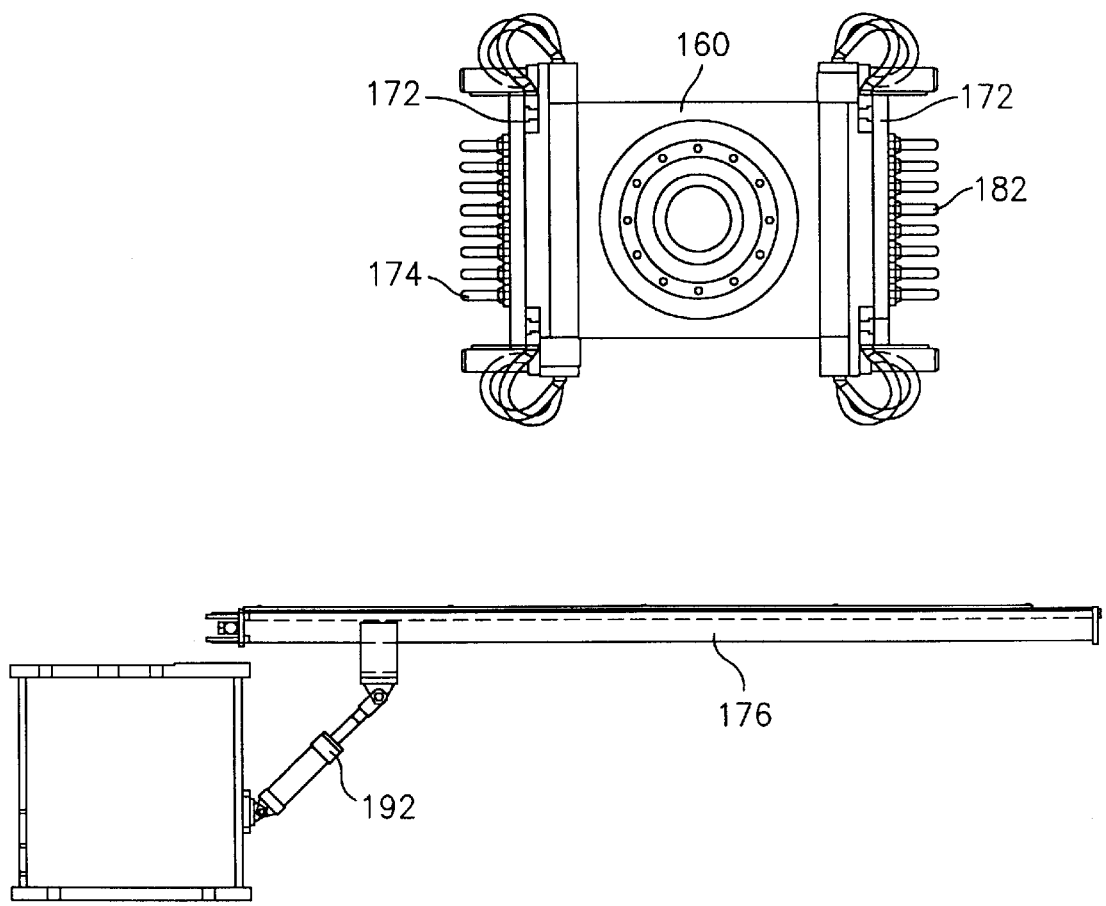
FIG. 9 is a side view of the turret block with an alternate rail capturing means.

In this embodiment, turret block 160 is shown in FIG. 9 with two mold core halves 172, each having multiple rows of mold cores 174. Track means 176 may be tipped or angled downwards by means of cylinder 192 to allow the molded parts 182 to simply slide off the end of rails 178, 180 onto a conveyor or any desired receiving means after a desired cooling cycle.

Figure 10:
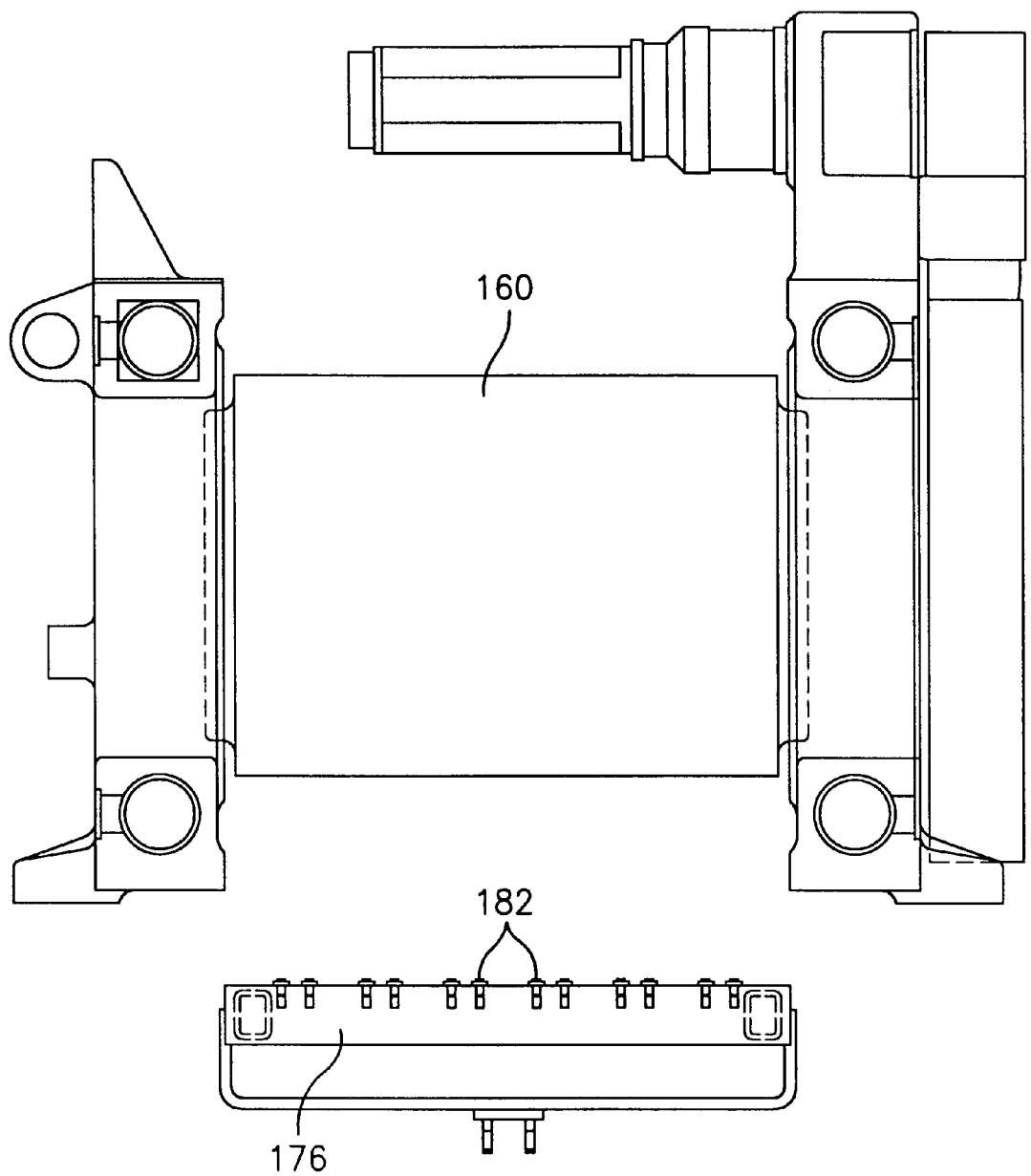
FIG. 10 is an end view of the turret block with alternate rail capturing means of FIG. 9.

FIG. 9 shows one mold half including molded parts 182 thereon, while the other mold half is shown without molded parts thereon having previously released same. The track means 176 is shown held in the horizontal position by cylinder 192. The end view of FIG. 10 shows the track means with multiple rows of molded parts held therein for cooling.

Figure 11:
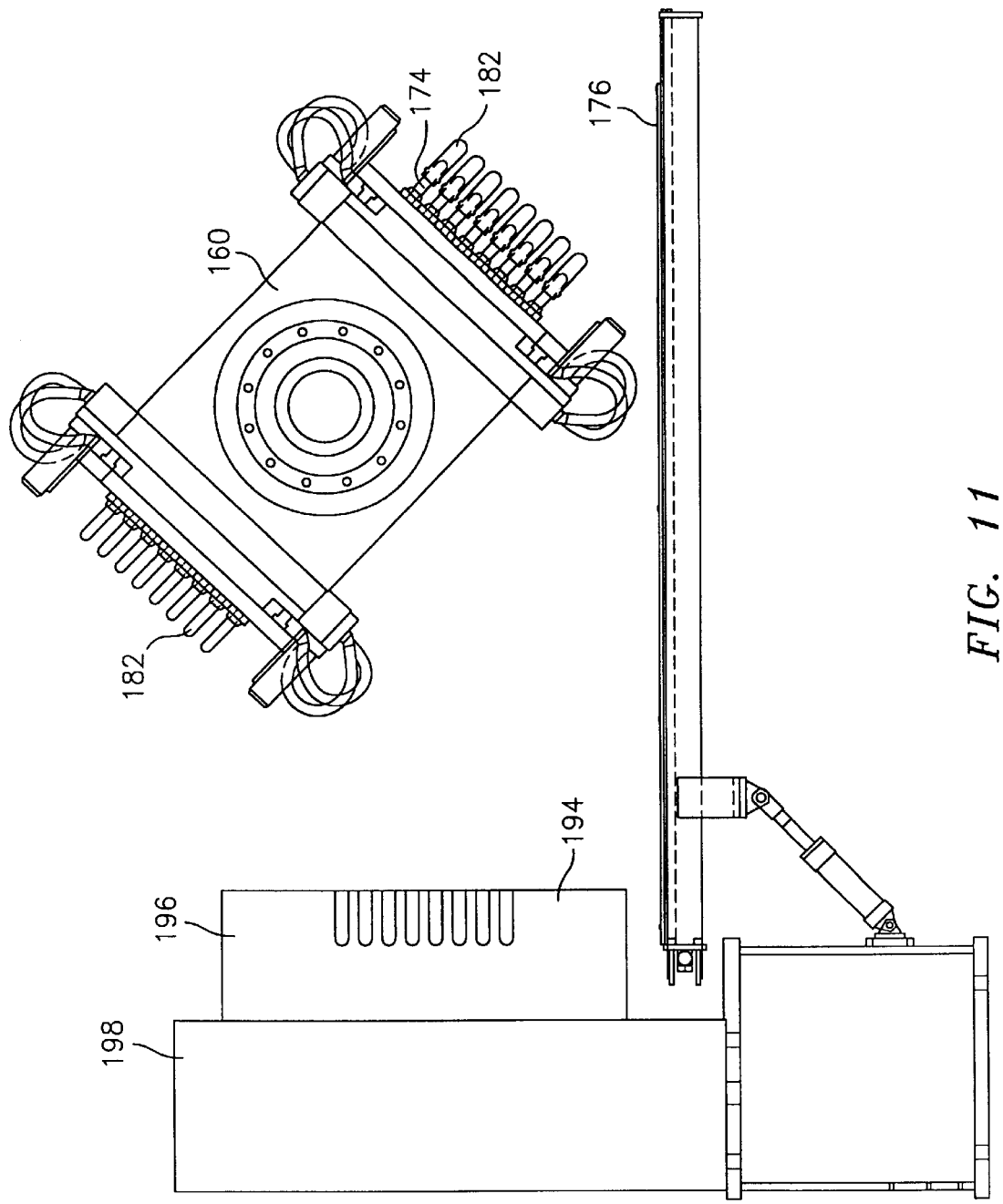
FIG. 11 is a side view of the turret block with alternate rail capturing means of FIG. 9 showing the turret in motion (rotating) and parts partially ejected from the cores.

FIG. 11 shows the molded parts 182 being ejected from one set of mold cores 174 during rotation of the turret block 160 through its 180 degree arc, while the other set of mold cores has parts 182 molded thereon from mold cavities 194 on mold cavity half 196 held on stationary or fixed platen 198. By not having to stop the rotation to eject the parts, valuable cycle time can be saved when using a two faced turret block. Also, the rotation of the block can occur during the stroke motion of the block, that is, as the block is opening—moving away from the stationary platen 198 and mold plate or mold cavity half 196, and as the block is closing—moving toward stationary platen 198 and mold cavity half 196. By combining these motions cycle time is again optimized.

Figure 12A:
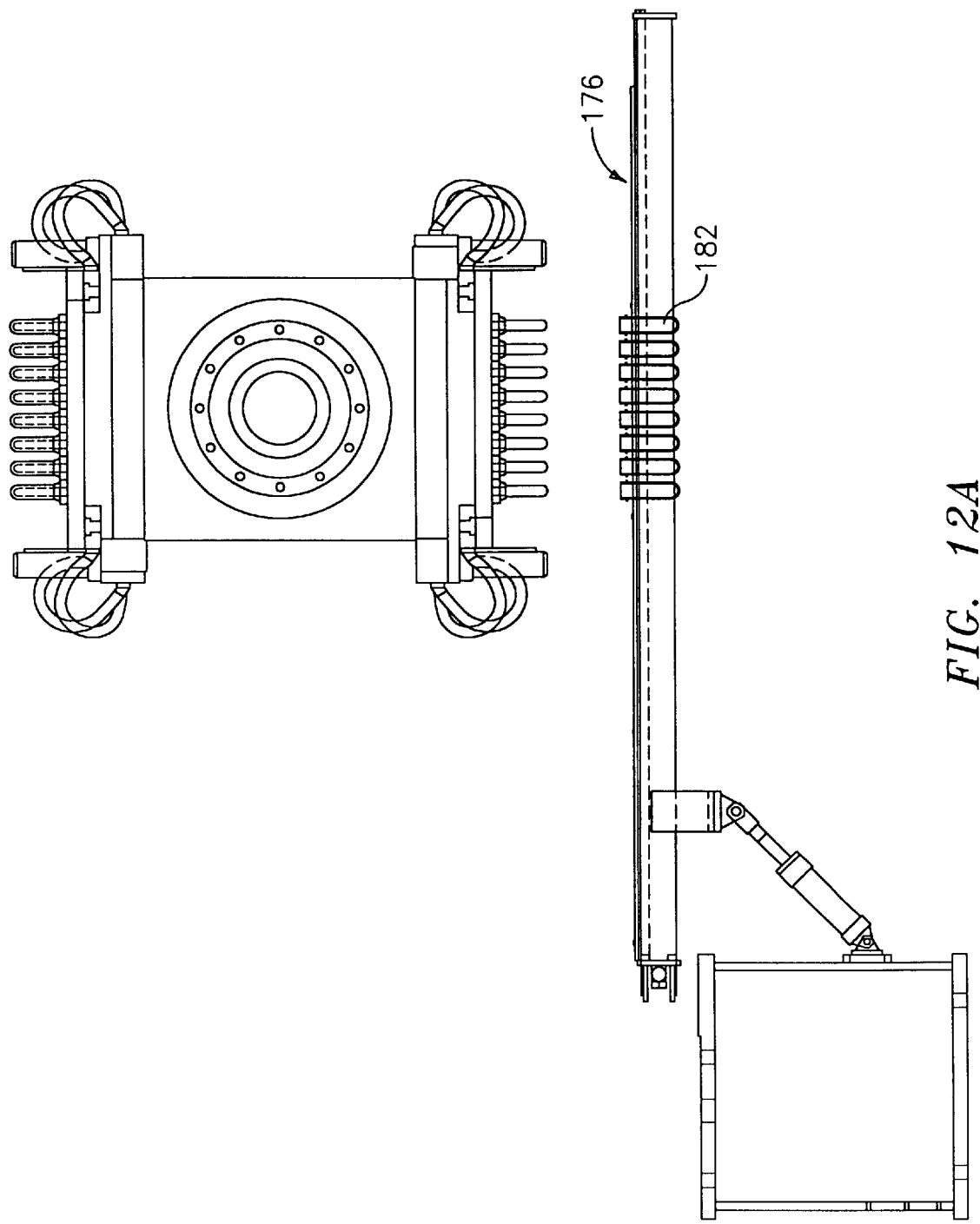
FIG. 12A is a side view of the turret block with alternate rail capturing means of FIG. 9 showing the turret block in motion (rotating) and parts ejected and captured between the rails.
Figure 12B:
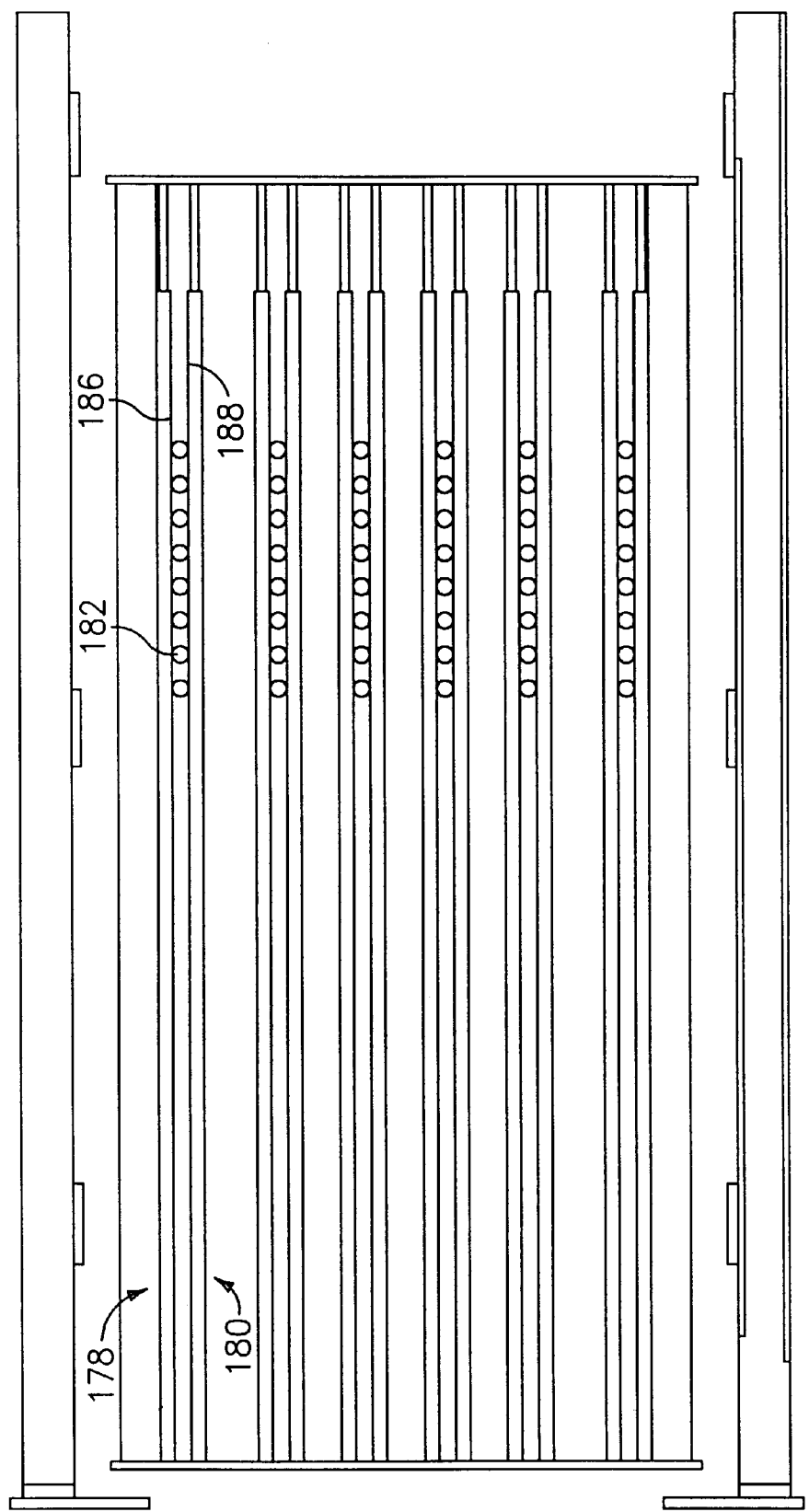
FIG. 12B is an plan view of the rails of FIG. 12A with captured ejected parts.
Figure 13A:
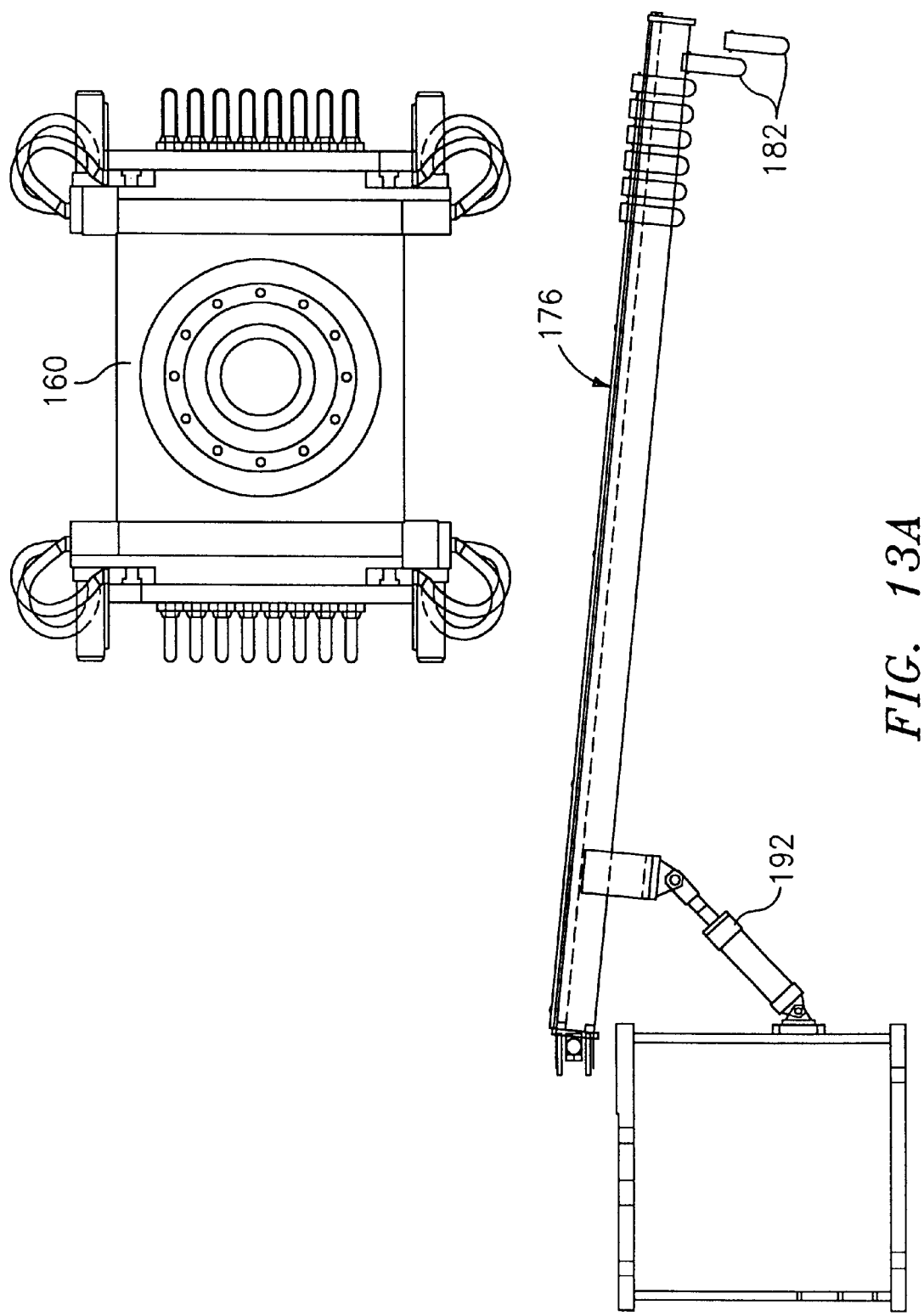
FIG. 13A is a side view of the turret block with alternate rail capturing means of FIG. 9 showing the rail means tipped or angled to allow the cooled ejected parts to slide off the end of the rails in oriented fashion to further downstream handling/processing equipment.
Figure 13B:
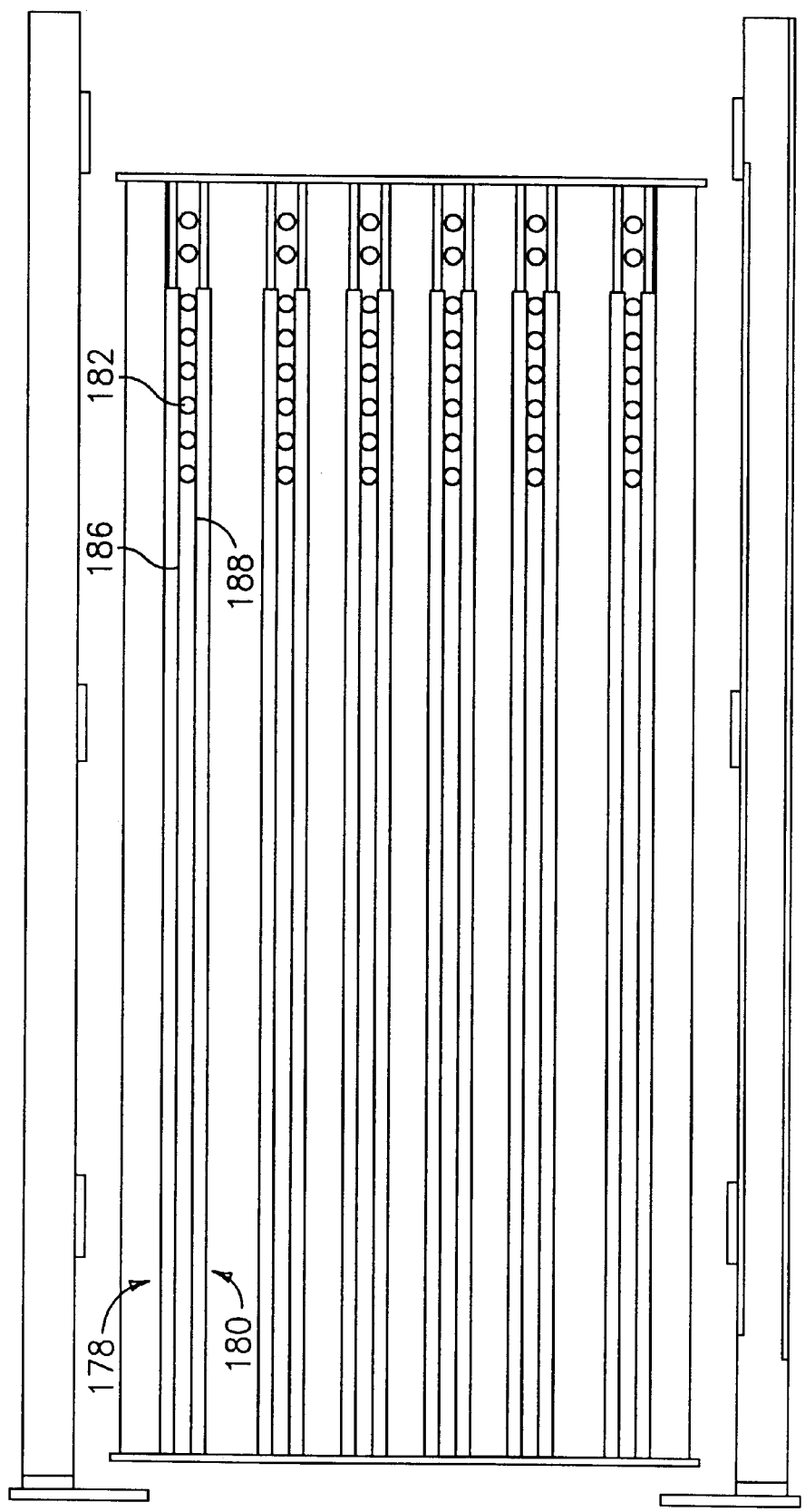
FIG. 13B is a plan view of the rails of FIG. 13A in the tipped position.

FIGS. 12A & 12B show parts 182 released onto track means 176 and retained between rails 178, 180 on ledge members 186, 188. FIGS. 13A and 13B show track means 176 tipped by cylinder 192 so that parts 182 can simply slide off after desired cooling.

Thus, in accordance with the present invention, track means having spaced track members or rails are used to capture parts ejected during rotational movement of the turret block for advantageously extended cooling cycles. Cycle time is advantageously minimized enabling the ejection of comparatively thick parts during turret block rotation without risking part damage and providing post mold cooling options. The present invention advantageously provides means to optimize cycle time for a turret block, advantageously a two faced turret block, by allowing ejection of partially cooled parts during block rotation and simultaneous block stroke motion. In addition, the present invention is simple and convenient to operate on a commercial scale.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A process for cooling molded parts, which comprises:
   providing an index molding machine having a rotatably movable turret block mounted thereon and having at least one mold core for forming molded articles thereon on at least one face of said rotatably movable turret block;
   positioning spaced track members thereon adjacent said rotatably movable turret block;
   transferring said molded articles from said mold core to said spaced track members during rotational movement of said turret block for retention and cooling on said spaced track members; and
   removing said cooled molded articles from said spaced track members.

2. A process according to claim 1, including engaging said mold core with a mold cavity for forming said molded articles therein, and rotating said turret block and mold core with said molded articles thereon to position said molded articles above said spaced track members for transfer of said molded articles from said mold core to said track members.

3. A process according to claim 2, including providing said molded articles with an outwardly extending flange, providing, said track means with spaced ledge members, retaining said flange on said spaced ledge members, and removing said flange from said spaced ledge members to release said molded articles from said track means.

4. A process according to claim 3, including moving said spaced ledge members away from each other so that the molded articles fall beneath said track members.

5. A process according to claim 3, including tipping said spaced ledge members so that the molded articles slide off said track members.

6. A process according to claim 1, including providing a plurality of mold cores on two opposed faces of said rotatably movable turret block.

7. A process according to claim 2, including positioning cooling means adjacent said track members for cooling said molded articles on said track members.

8. A process according to claim 2, including providing a plurality of mold cores with a molded article on each mold core.

9. A process according to claim 1, including positioning said spaced track members beneath said rotatably movable turret block.

10. A process according to claim 1, including stripping said molded articles from said cores by stripper rings.

* * * * *

UNITED STATES PATENT AND TRADEMARK OFFICE
CERTIFICATE OF CORRECTION

PATENT NO. : 6,290,891 B1  
DATED : September 18, 2001  
INVENTOR(S) : John Galt Page 1 of 1

It is certified that error appears in the above-identified patent and that said Letters Patent is hereby corrected as shown below:

Column 8, claim 10,  
Line 11, after "from said" -- mold -- should be inserted.

Signed and Sealed this

Twelfth Day of March, 2002

Attest:

JAMES E. ROGAN  
*Director of the United States Patent and Trademark Office*

*Attesting Officer*